US012783091B2

(12) United States Patent
Mayer et al.

(10) Patent No.: US 12,783,091 B2
(45) Date of Patent: Nov. 3, 2026

(54) TOUCH SCREEN MOTION COMPENSATION

(71) Applicant: Analog Devices, Inc., Wilmington, MA (US)

(72) Inventors: Christopher Mayer, Dover, MA (US); Tao Yu, Needham, MA (US)

(73) Assignee: ANALOG DEVICES, INC., Wilmington, MA (US)

( * ) Notice: Subject to any disclaimer, the term of this patent is extended or adjusted under 35 U.S.C. 154(b) by 0 days.

(21) Appl. No.: 19/064,165

(22) Filed: Feb. 26, 2025

(65) Prior Publication Data

US 2025/0284367 A1 Sep. 11, 2025

Related U.S. Application Data

(60) Provisional application No. 63/563,200, filed on Mar. 8, 2024.

(51) Int. Cl.

| | |
|---|---|
| ***G06F 3/041*** | (2006.01) |
| ***B60K 35/10*** | (2024.01) |
| ***B60K 35/22*** | (2024.01) |
| ***B60K 35/28*** | (2024.01) |
| ***G01P 13/00*** | (2006.01) |
| ***G06F 3/044*** | (2006.01) |
| ***G06N 3/091*** | (2023.01) |

(52) U.S. Cl.
CPC .......... *G06F 3/04186* (2019.05); *B60K 35/10* (2024.01); *B60K 35/22* (2024.01); *B60K 35/28* (2024.01); *G01P 13/00* (2013.01); *G06F 3/044* (2013.01); *G06N 3/091* (2023.01); *B60K 2360/1438* (2024.01); *B60K 2360/167* (2024.01)

(58) Field of Classification Search
CPC .... G06F 3/04186; G06F 3/044; G06F 3/0418; G06F 3/0488; B60K 35/10; B60K 35/22; B60K 35/28; B60K 2360/1438; B60K 2360/167; B60K 2360/1442; B60K 2360/199; G01P 13/00; G06N 3/091
See application file for complete search history.

(56) References Cited

U.S. PATENT DOCUMENTS

2012/0306768 A1* 12/2012 Bailey ...................... G09G 5/00 345/173
2018/0335856 A1* 11/2018 Wolters ................ G06F 1/1694
(Continued)

OTHER PUBLICATIONS

Le et al. Predic Touch: A System to Reduce Touchscreen Latency using Neural Networks and Inertial Measurement Units, Proceedings of The 2017 ACM International Conference On Interactive Surfaces and Spaces, ACMPUB27, New York, NY, USA, Oct. 17, 2017, pp. 230-239, XP058458449 (Year: 2017).*
(Continued)

*Primary Examiner* — Jonathan A Boyd
(74) *Attorney, Agent, or Firm* — Knobbe, Martens, Olson & Bear, LLP

(57) ABSTRACT

Apparatus and methods for touch screen motion compensation are disclosed herein. In certain embodiments, a touch screen motion compensation system for a vehicle includes an accelerometer that generates accelerometer data indicating a motion of the vehicle, a touch screen display that generates touch location data in response to tactile input from a user, and a computing system that generates compensated touch location data by compensating the touch location data based on the accelerometer data.

20 Claims, 8 Drawing Sheets

(56) References Cited

U.S. PATENT DOCUMENTS

| | | | | |
|---|---|---|---|---|
| 2023/0086516 | A1* | 3/2023 | Meyer .................... | B60K 35/50<br>345/173 |
| 2025/0080845 | A1 | 3/2025 | Wu et al. | |

OTHER PUBLICATIONS

Extended European Search Report for Application No. 25161430.1 dated Jul. 16, 2025 in 9 pages.

Le et al., "PredicTouch a System to Reduce Touchscreen Latency using Neural Networks and Inertial Measurement Units", Proceedings of the 2017 ACM International Conference on Interactive Surfaces and Spaces, dated Oct. 17, 2017, pp. 230-239.

European Office Action issued for Application No. 25161430.1 dated Aug. 5, 2026 in 7 pages.

* cited by examiner

TOUCH SCREEN MOTION COMPENSATION

CROSS-REFERENCE TO RELATED APPLICATIONS

The present application claims priority to U.S. Provisional Patent Application No. 63/563,200, filed Mar. 8, 2024, and titled "TOUCH SCREEN MOTION COMPENSATION," the entirety of which is hereby incorporated herein by reference.

FIELD OF THE DISCLOSURE

Embodiments of the invention relate to electronic systems, and more particularly to, motion compensation of touch screen displays.

BACKGROUND

In vehicles, such as modern automobiles or cars, a touch screen is often centrally positioned and used by a user, such as a driver and/or passenger, to control various car functions. For example, touch screen input from a user can be used to control the vehicle's infotainment system, thereby controlling navigation, audio settings, phone calling or messaging, temperature, vehicle diagnostics, and/or other vehicle systems or functions.

SUMMARY OF THE DISCLOSURE

The inventors of the present disclosure have recognized that touch screens work well in vehicles when the vehicle is stopped, thereby allowing easy access to hundreds of options, menus, and submenus. The inventors of the present disclosure have also recognized that once the vehicle is moving, particularly when a road is uneven and vibrations arise, pressing a desired button on the touch screen display can be quite difficult on account of the movement of the car, screen, and/or user.

In one aspect, the present disclosure relates to a touch screen motion compensation system for a vehicle. The touch screen motion compensation system includes an accelerometer configured to generate accelerometer data indicating a motion of the vehicle, a touch screen display configured to generate touch location data in response to tactile input from a user, and a computing system configured to generate compensated touch location data by compensating the touch location data based on the accelerometer data.

In another aspect, a method of touch screen motion compensation includes generating, by an accelerometer of a vehicle, accelerometer data indicating a motion of the vehicle, generating, by a touch screen display, touch location data in response to tactile input from a user, and generating, by a computing system, compensated touch location data by compensating the touch location data based on the accelerometer data.

In another aspect, a vehicle includes a vehicle body, an accelerometer attached to the vehicle body and configured to generate accelerometer data indicating a motion of the vehicle, a touch screen display configured to generate touch location data in response to tactile input from a user, and a computing system configured to generate compensated touch location data by compensating the touch location data based on the accelerometer data.

In another aspect, a computing system includes data processing hardware and memory hardware in communication with the data processing hardware. The memory hardware storing instructions that when executed by the data processing hardware cause the data processing hardware to perform operations including receive accelerometer data indicating a motion of the vehicle from an accelerometer, receive touch location data from a touch screen display in response to tactile input to the touch screen display from a user, and generate compensated touch location data by compensating the touch location data based on the accelerometer data.

DETAILED DESCRIPTION

Figure 1:
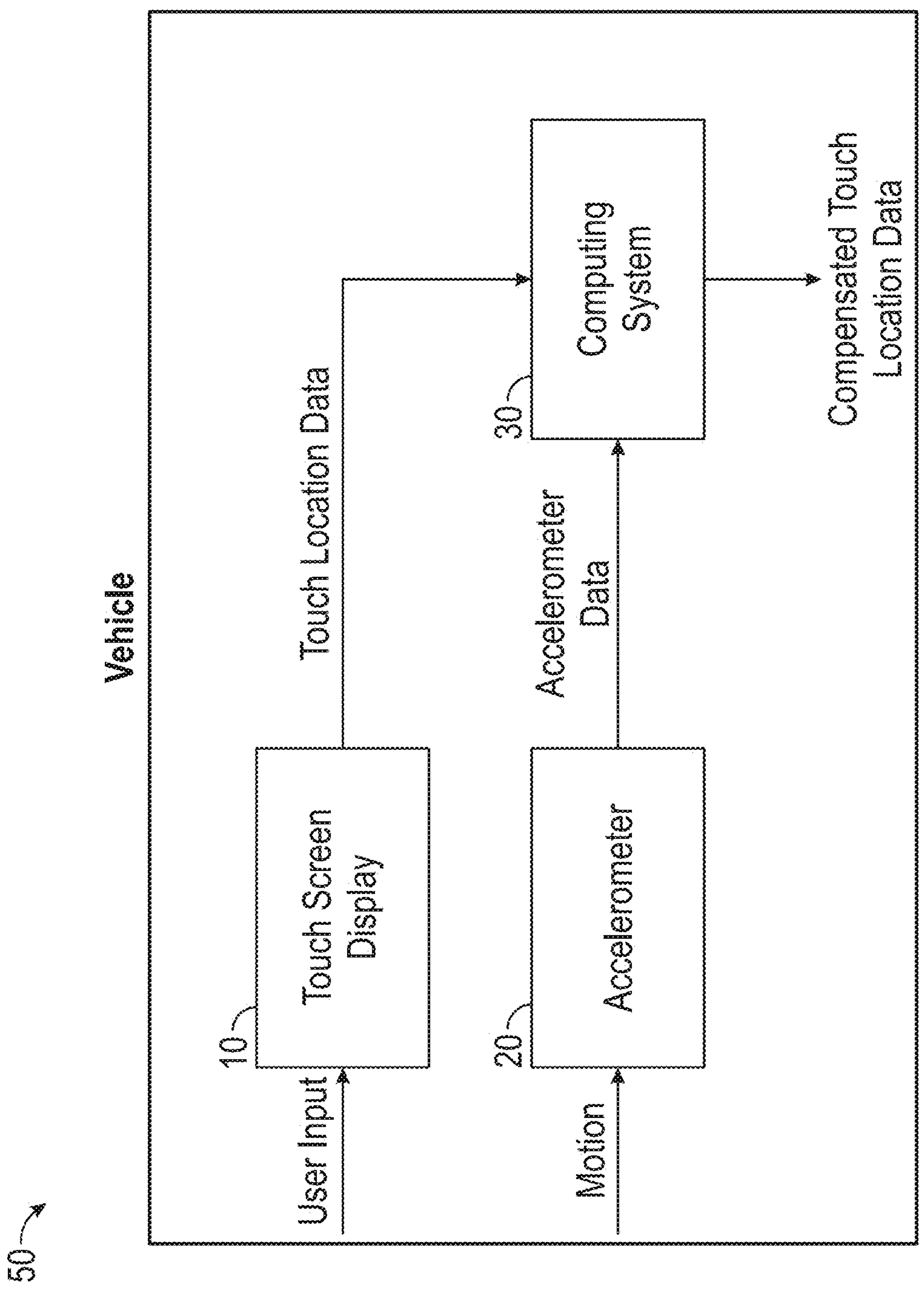
FIG. 1 is a schematic diagram of one embodiment of a vehicle with touch screen motion compensation.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Overview of Example Embodiments of Touch Screen Motion Compensation

The following section provides an overview of example embodiments for touch screen motion compensation. While certain embodiments have been described, these embodiments have been presented by way of example only and are not intended to limit the scope of the disclosure. Any suitable combination of features of the embodiments described can be combined to provide further embodiments.

Apparatus and methods for touch screen motion compensation are disclosed herein. In certain embodiments, a touch screen motion compensation system for a vehicle includes an accelerometer that generates accelerometer data indicating a motion of the vehicle, a touch screen display that generates touch location data in response to tactile input from a user, and a computing system that generates compensated touch location data by compensating the touch location data based on the accelerometer data.

Accordingly, in such embodiments, an accelerometer can be used to measure a vehicle's motion, including vibrations. Additionally, in such embodiments, these accelerometer readings can be applied to the touch location data to compensate the user's input for the car's movement.

By providing touch screen motion compensation in accordance with such embodiments, an improved touch screen for a vehicle is provided. For example, a touch screen implemented with one or more of the motion compensation schemes herein can more accurately detect the locations of where a user intended to touch, thus providing an improvement over existing vehicular touch screen display technology.

In such embodiments, the accelerometer can be placed in a variety of locations in a vehicle, including but not limited to, on a dashboard or chassis. Thus, the accelerometer need not be collocated with the touch screen in some implementations. In certain implementations, the accelerometer may also be used in the vehicle for other functions, thereby reducing vehicle component costs. In some embodiments, the accelerometer is placed in a location in which the motion detection by the accelerometer is highly correlated with the motion on the touch screen, for instance, a correlation coefficient greater than 0.75.

In some implementations, the touch screen can compensate touch location data without modifying a graphical rendering of objects (for instance, buttons, dials, or other information and/or controls) on the screen. In other implementations, the touch screen can compensate touch location data while also modifying a graphical rendering of objects on the screen.

In certain implementations, the touch location data includes screen coordinates (for instance, a two-dimensional X/Y coordinate) of where a touch occurred on the touch screen. Additionally, in some implementations, the touch screen motion compensation system can generate the compensated touch location data as an adjusted screen coordinate (for instance, a modified two-dimensional X/Y coordinate). In such implementations, accelerometer data over a time window may be used to compensate the X/Y coordinate to remove the unexpected movement and provide a modified X/Y coordinate of where the user intended to touch. In such implementations, the modified X/Y coordinate is then used to detect what screen object (for instance, a button, a dial, etc.) was intended to be pushed and the car functionality is controlled as if the user touched the detected object, even if in fact the uncompensated X/Y coordinate did not actually overlap with that object.

In some implementations, training is used to train the computing system to determine how to compensate the touch location data based on the accelerometer data stream. The training in such implementations can include foreground and/or background training.

In one example of foreground training, a circle or other object is displayed on the touch screen to represent a button or push target, and a user presses a portion (for instance, a center) of the object to aid in training. Such training can be done while driving the vehicle to induce random vibrations and/or accelerations into the training process.

In such an implementation, the accelerometer data is captured along with the X/Y which was measured during the screen touch and the X/Y of the center of the objection on the screen. In some embodiments, the data streams are timestamped to allow for data synchronization between when the object was touched relative to the accelerometer readings.

In certain implementations, the computing system implements a model (for instance, a neural network in some embodiments) that is trained with the data. After training, the model is used in these implementations to predict touch location, for instance, where the objection (e.g., button) is located given a screen touch position X/Y and a stream of accelerometer readings.

The prediction in such implementations may be user specific, for example, based on a current user detected by user input selection or automatically (for instance, by facial recognition, detecting a particular key fob used to start a vehicle, and/or any other suitable user detection mechanism).

In some implementations, background or passive training can additionally or alternatively be used. In certain implementations, background training includes training data on a history of normal screen interactions (for instance, button presses) as the vehicle is operated (for instance, driven on a road). One example technique would be to measure how far from a center of a button the user pressed when the user accessed the screen during normal operation, and then similarly train the model based on the X/Y which was pressed, the X/Y of the center of the button, and the accelerometer stream. The technique of this example is an effective training method, particularly when the system discerns that the user pressed the correct intended button. In applications in which the button was missed entirely (for instance, because of a big jolt) deterministic training and/or other suitable techniques may be used.

In certain implementations, the predictive model is configured to model the damping effects of a seat cushion, a body of the user, a motion of the user's arm suspended as a beam in the presence of the acceleration, and/or other motion effects. In some embodiments, the model may also depend on the X/Y coordinate being touched, because at different points of the screen an arm can be extended by varying amounts thus leading to different touch error magnitudes. In certain implementations, the touch screen system is implemented to detect when a user has anchored a portion of their hand or wrist (for instance, a thumb on an edge of the screen), and the training accounts for such anchoring when training.

Various embodiments herein include an accelerometer. Such an accelerometer can be implemented in a variety of ways, including not only by a 3-axis accelerometer for collecting multi-dimensional movement data, but also accelerometers of fewer axis (for instance, pitch, roll, and/or yaw accelerometers) can also be used when orientated to correlate with the motion of the touch screen. The accelerometer of these embodiments can be attached in various locations, for instance, a vehicle chassis, a touch screen display panel, or any other surface that is correlated with the motion of the touch screen.

In certain implementations, the accelerometer performs multiple functions in the vehicle, and thus the touch screen display system uses an existing accelerometer such as those currently used in typical cars. Accordingly, certain embodiments can work from existing accelerometer data streams in cars which already include them. In some implementations, the X/Y coordinates from the touch controller can be processed (for instance, filtered) in the software of the computing system.

In some applications, directly outputting a compensated X/Y location with high accuracy may be challenging due to an amount of data processed and/or a user's screen touching habits. Accordingly, in some embodiments, a model is trained to input the touch location and the location of the objects (for instance, buttons) near the touch location, and the model predicts (for instance, learns and outputs) a distribution of which object (for instance, button) is pressed. For instance, in these embodiments, such a distribution can correspond to a probability distribution that the user touched each of several possible screen objects.

In certain implementations, the model can also receive the touch location and the location of the objects (for instance, buttons) near the touch location and output the probability of a button or other object being pressed.

In some embodiments, sensor data in addition to accelerometer data is used. In one example, a digital representation of a sense current of a capacitive touch screen can be used due to the change of proximity of finger to the electrodes under the screen's glass (for instance, detecting a difference of finger position over time). Thus, in some implementations, a time series on the sense current (for example, capacitor charge current) with relative motion between finger and screen around the touch event can be an additional signal indicating the stability of the touch. Thus, in such embodiments, additional sensor(s) generate additional sensor data in response to interaction from the user, and the compensated touch location data is based on the additional sensor data.

Implementations using a sense current can also aid in differentiating a user's attempt to stabilize their touch by anchoring on the non-touch portion of the display's console.

Preprocessing of accelerometer data can also be used in some implementations. In one example, the accelerometer data is preprocessed using adaptive filtering techniques. For instance, an analogy would be road noise cancellation where an adaptive filter is learned to transform the vibration data into anti-noise. In such implementations, using adaptive filtering can provide the benefit of the model being more interpretable and/or improved convergence for implementations using a neural network.

In some implementations, the computing system uses a neural network is configured to operate using continuous learning. For example, the system can be implemented to continuously learn and adapt the model as the user behavior changes over time due to the users' own adaptation to improve touch accuracy. In certain implementations, the system captures user behavior including their touch events with other sensor data, as well as the interactive components on the screen. Furthermore, in such implementations, the system can infer failed user interaction when detecting non-operation after touch and/or repeated touch in proximity and resulting in non-typical user interface (UI) interaction (for instance, illogical or anomaly from usual). In such implementations, the user interactions can be treated as negative examples to continuously finetune models.

Description of Embodiments of Touch Screen Motion Compensation Shown in Figures The following section provides a description of the embodiments for touch screen motion compensation shown in the figures. While certain embodiments have been illustrated and described, these embodiments have been presented by way of example only and are not intended to limit the scope of the disclosure. Any suitable combination of features of the described embodiments can be combined to provide further embodiments. Furthermore, it will be understood that certain embodiments can include more elements than illustrated in a drawing and/or a subset of the elements illustrated in a drawing. Further, some embodiments can incorporate any suitable combination of features from two or more drawings. Moreover, the embodiments of the figures can be modified to include any suitable combination of features from the embodiments described in the overview section above.

FIG. 1 is a schematic diagram of one embodiment of a vehicle 50 with touch screen motion compensation. The vehicle 50 includes a touch screen motion compensation system including an accelerometer 20 that generates accelerometer data indicating a motion of the vehicle 50, a touch screen display 10 that generates touch location data in response to tactile input from a user, and a computing system 30 that generates compensated touch location data by compensating the touch location data based on the accelerometer data.

The vehicle 50 can correspond to any vehicle that suffers from motion such as vibrations. In some implementations, the vehicle 50 corresponds to a land-based vehicle that drivers on the ground over roads or land, such as an automobile, truck, off-terrain vehicle, motorcycle, or other land vehicle. However, other implementations are possible, such as applications in which the vehicle 50 is a watercraft (for instance, a jet ski or boat) or an aircraft (for instance, an airplane or helicopter).

The touch screen motion compensation system of FIG. 1 can be implemented with any combination of features disclosed herein.

Figure 2:
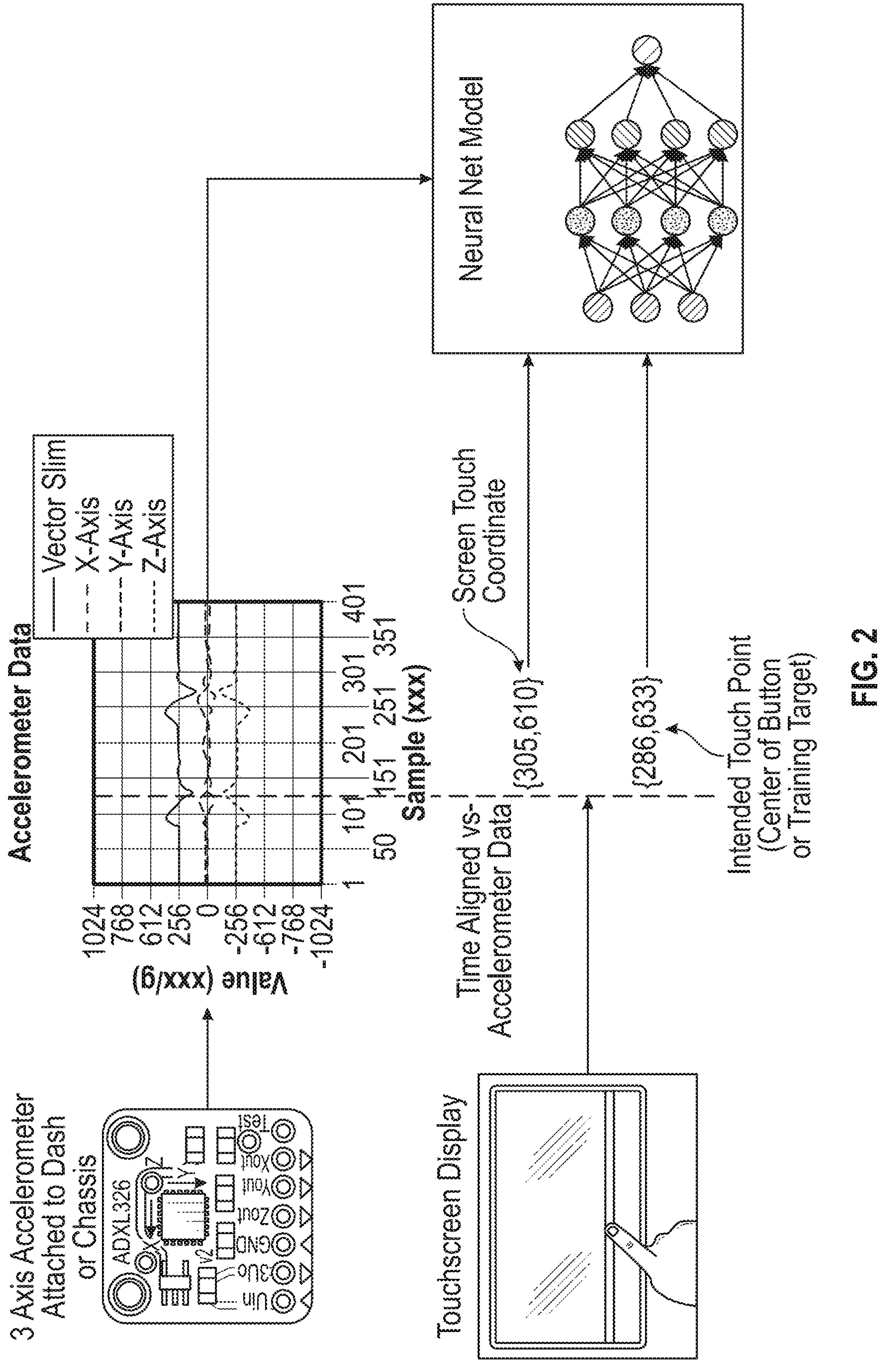
FIG. 2 is a schematic diagram showing training of a touch screen motion compensation system according to one embodiment.
Figure 3:
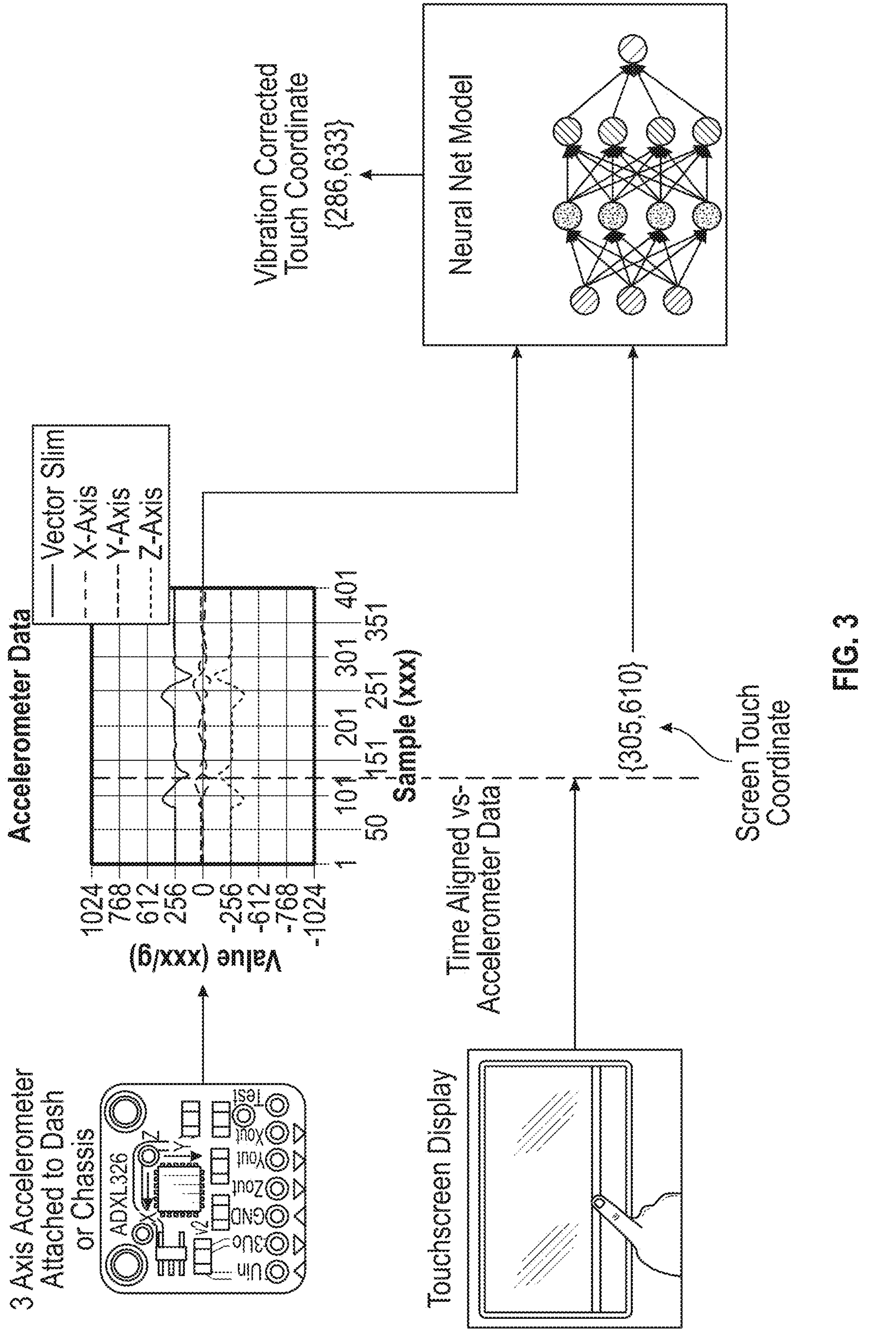
FIG. 3 is a schematic diagram showing location prediction by a touch screen motion compensation system according to one embodiment.

FIG. 2 is a schematic diagram showing training of a touch screen motion compensation system according to one embodiment. FIG. 3 is a schematic diagram showing location prediction by a touch screen motion compensation system according to one embodiment.

With reference to FIGS. 2 and 3, in the illustrated embodiment the touch screen motion compensation system includes a 3-axis accelerometer (attached to a dash or chassis of the vehicle, in this example), a touch screen display, and a computing system implemented with a neural network (net) model. Additionally, the 3-axis accelerometer outputs accelerometer data, which is provided to the neural network model. Furthermore, the touch location data is outputted from the touch screen display and provided to the neural network model. The accelerometer data and touch location data are time-aligned by the computing system and fed into the neural network model, in this embodiment.

In FIG. 2, the neural network model is trained using an intended touch point (for instance, center of button or other training target) along with the accelerometer data and touch location data. In this example, X/Y screen coordinates are used for the training.

In FIG. 3, the neural network model predicts adjusted or compensated X/Y screen coordinates based on the accelerometer data and touch location data inputted into the neural network model.

Figure 4:
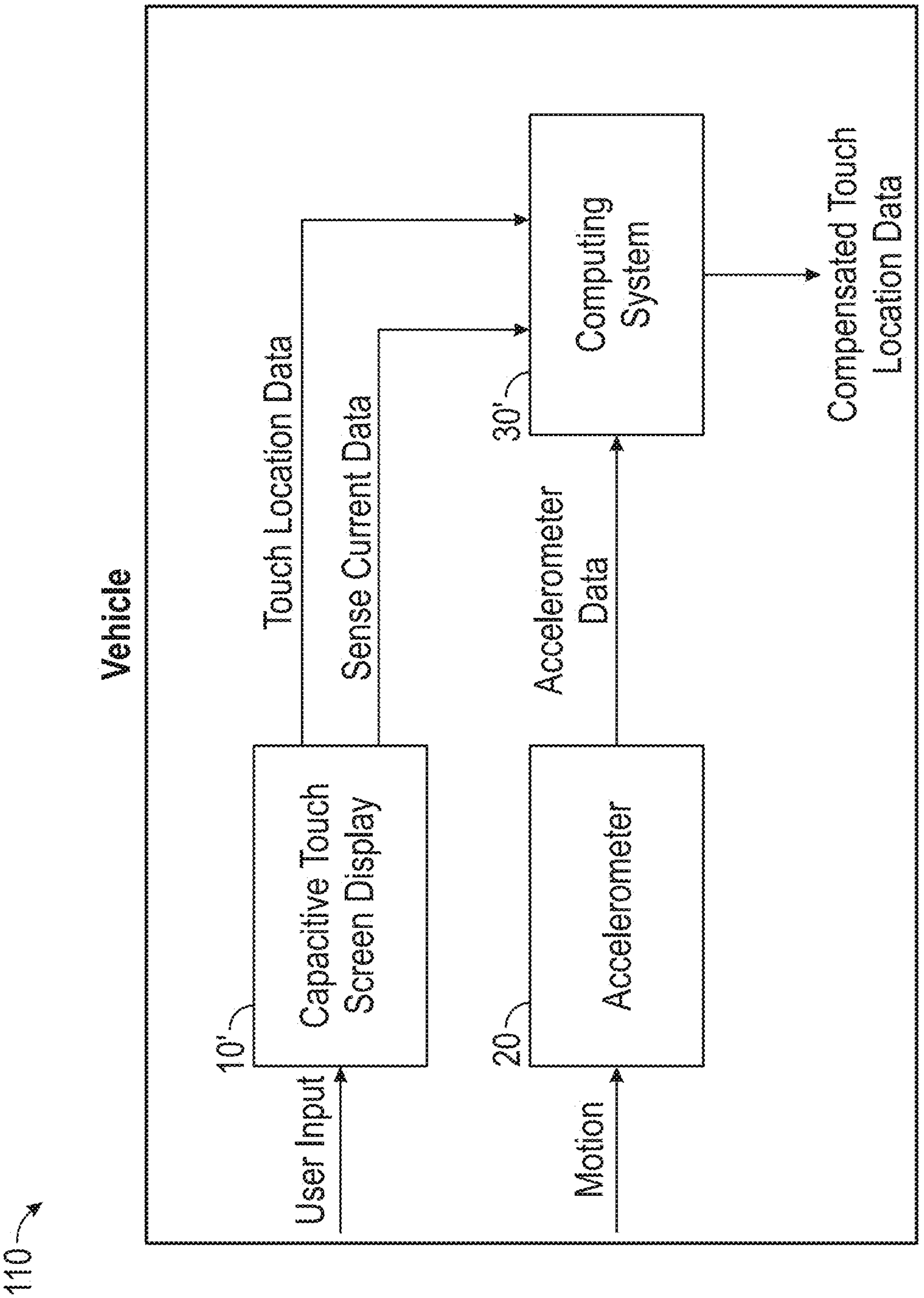
FIG. 4 is a schematic diagram of another embodiment of a vehicle with touch screen motion compensation.

FIG. 4 is a schematic diagram of another embodiment of a vehicle 110 with touch screen motion compensation. The vehicle 110 includes a touch screen motion compensation system including an accelerometer 20 that generates accelerometer data indicating a motion of the vehicle 50, a capacitive touch screen display 10' that generates touch location data and sense current data in response to tactile input from a user, and a computing system 30' that generates compensated touch location data by compensating the touch location data based on the accelerometer data and the sense current data.

The touch screen motion compensation of FIG. 4 is similar to the touch screen motion compensation of FIG. 1, except that the touch screen motion compensation of FIG. 4 further uses the sense current data from the capacitive touch screen display 10' to provide touch screen motion compensation.

For example, with reference to FIG. 4, a digital representation of the sense current of the capacitive touch screen display 10' can be used due to the change of proximity of finger to the electrodes under the screen's glass (for instance, detecting a difference of finger position over time). Thus, a time series on the sense current (for example, capacitor charge current) with relative motion between the finger and the screen 10' around the touch event can be used by the computing system 30' as an additional signal indicating the stability of the touch. Such as technique can also aid in differentiating a user's attempt to stabilize their touch by anchoring on the non-touch portion of the display's console.

Figure 5:
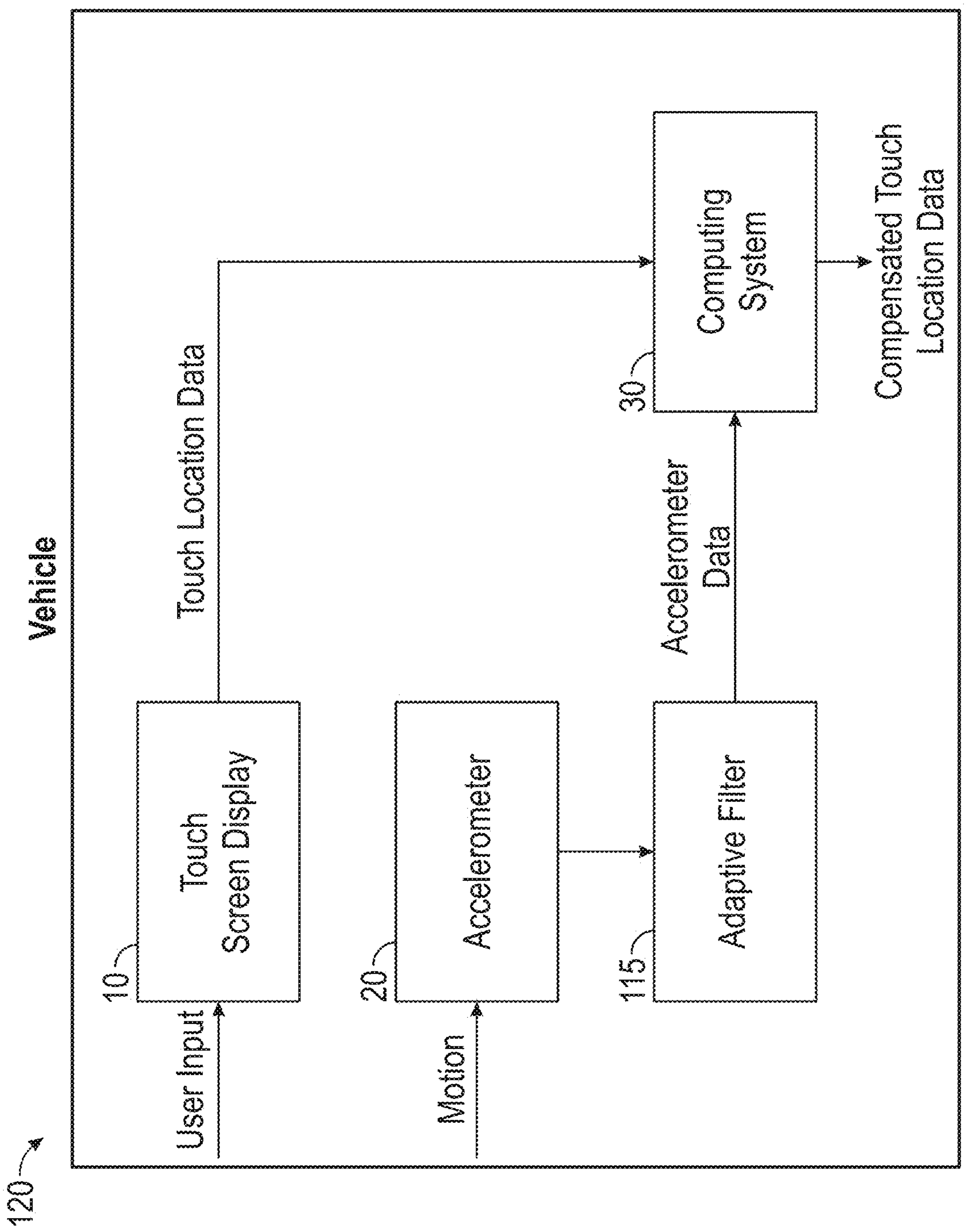
FIG. 5 is a schematic diagram of another embodiment of a vehicle with touch screen motion compensation.

FIG. 5 is a schematic diagram of another embodiment of a vehicle 120 with touch screen motion compensation. The vehicle 120 includes a touch screen motion compensation system including an accelerometer 20 that generates accelerometer data indicating a motion of the vehicle 50, an adaptive filter 115 that pre-processes the accelerometer data prior to the computing system 30 performing motion compensation, and a touch screen display 10 that generates touch location data in response to tactile input from a user, and a computing system 30 that generates compensated touch location data by compensating the touch location data based on the accelerometer data.

The adaptive filter 115 provides preprocessing of accelerometer data, which can provide the benefit of improved interpretability of the accelerometer data and/or improved model convergence. In certain implementations, the adaptive filter 115 is implemented as a component of the computing system 30 (for instance, as software running on the computing system 30).

Figure 6:
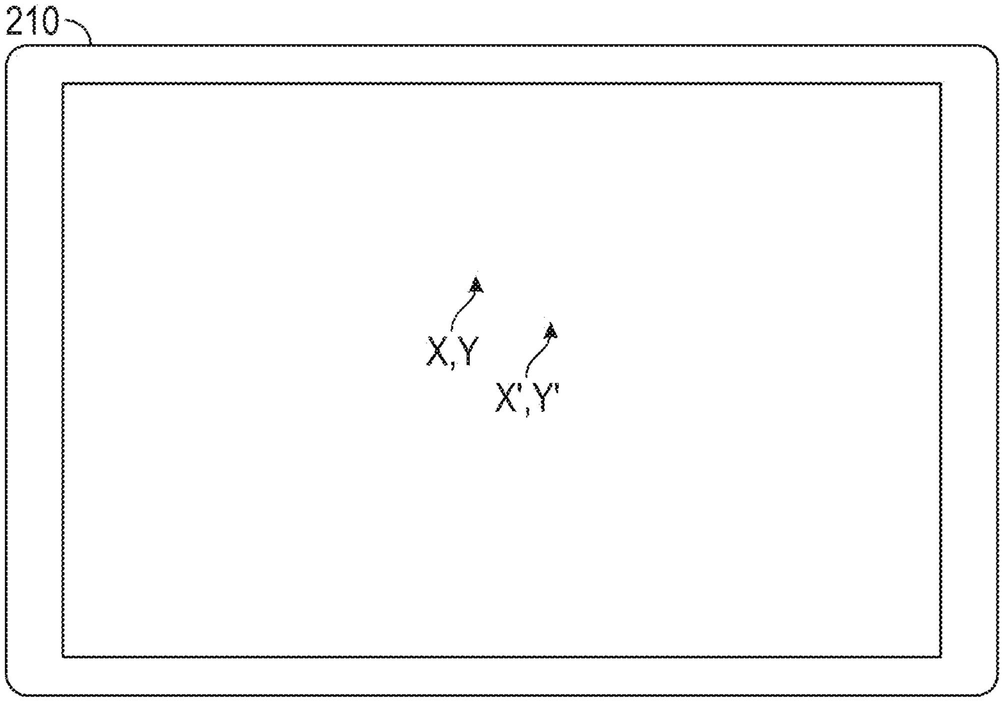
FIG. 6 is a schematic diagram of a touch screen with motion compensation according to one embodiment.

FIG. 6 is a schematic diagram of a touch screen with motion compensation 210 according to one embodiment. In the illustrated embodiment, the user has touched a location with coordinates X/Y and the touch screen motion compensation system provides compensation to predict that adjusted coordinates X'/Y' corresponds to a location that the user intended to touch.

Figure 7:
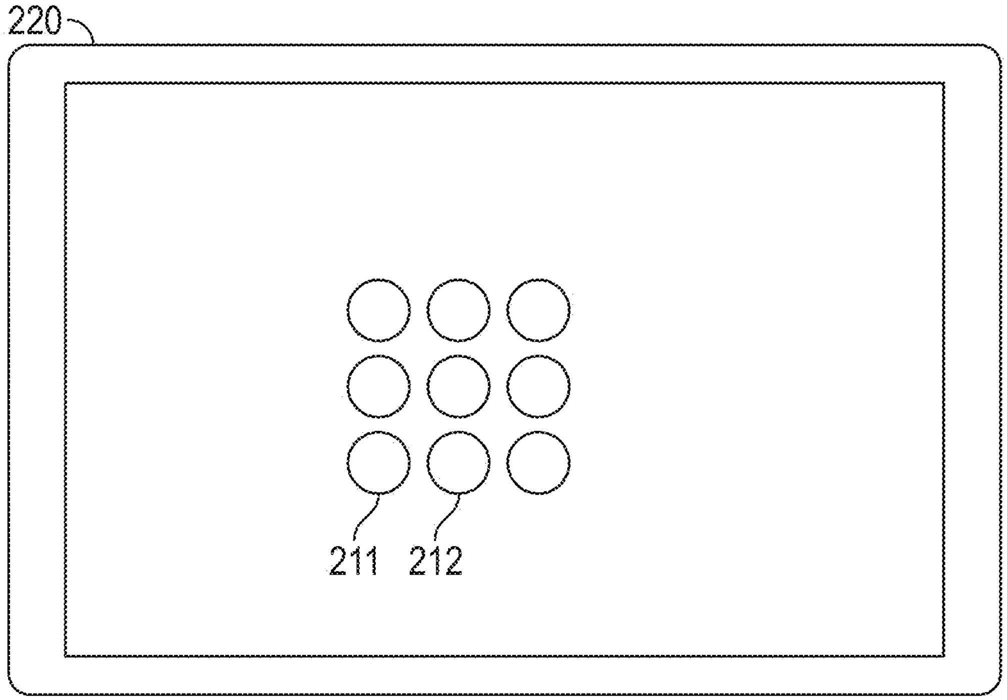
FIG. 7 is a schematic diagram of a touch screen with motion compensation according to another embodiment.

FIG. 7 is a schematic diagram of a touch screen 220 with motion compensation according to another embodiment. In the illustrated embodiment, the user has touched an object 211 (for instance, a first button) but the touch screen motion compensation system provides compensation to predict that the object 212 (for instance, a second button) corresponds to the object that the user intended to touch.

Figure 8:
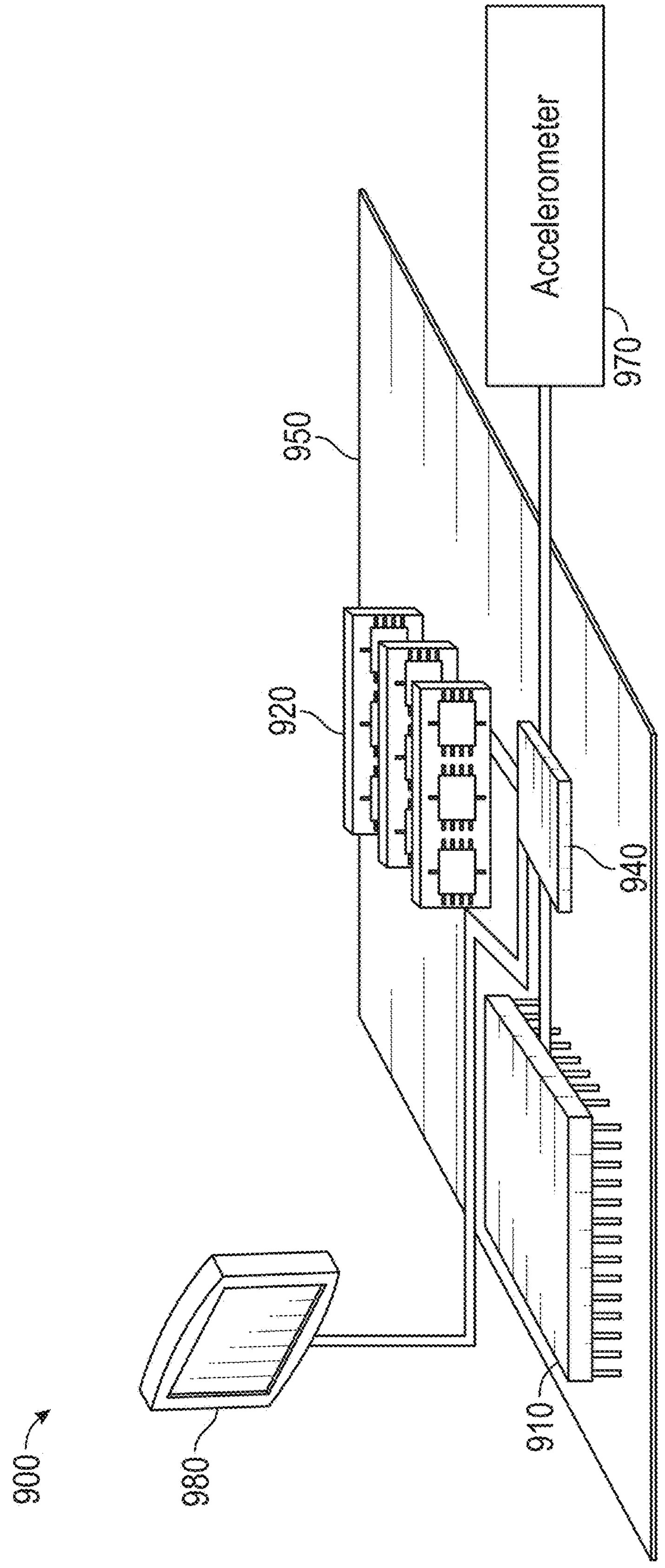
FIG. 8 is a schematic diagram of one embodiment of a touch screen motion compensation system.

FIG. 8 is a schematic diagram of one embodiment of a touch screen motion compensation system 900. The touch screen motion compensation system 900 includes a computing system 950, an accelerometer 970, and a touch screen display 980.

The touch screen motion compensation system can be implemented in a vehicle to improve the accuracy of the detected location of user input while the vehicle is moving. The touch screen motion compensation system 900 can be implemented in any vehicle including, but not limited to, an automobile or truck.

The computing system 950 depicts an example implementation of a computing system suitable for implementing motion compensating for a touch screen display. The depicted components as well as their connections, relationships, and functions are intended to be exemplary only, and are not meant to limit implementations of the embodiments described and/or claimed herein.

As shown in FIG. 8, the computing system 950 includes data processing hardware 910, memory hardware 920, and an interface 940. The depicted components of the computing system 950 can be interconnected using various wired or wireless busses and in some configurations are mounted on a common circuit board. However, other implementations are possible.

The data processing hardware 910 processes instructions for execution within the computing system 950, including instructions stored in the memory hardware 920. The data processing hardware 910 can include one or more central processing units (CPUs), configurable compute units (for example, field programmable gate arrays or FPGAs), digital signal processors (DSPs), neural processing units (NPUs), application specific integrated circuits (ASICs), graphics processing units (GPUs), and/or any other hardware processing components.

The memory hardware 920 stores information non-transitorily within the computing system 950. The memory hardware 920 can include a computer-readable medium, a volatile memory unit(s), and/or non-volatile memory unit(s). The memory hardware 920 can include physical devices used to store programs (e.g., sequences of instructions) or data (e.g., program state information) on a temporary or permanent basis for use by the computing system 950. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random-access memory (DRAM), static random-access memory (SRAM), phase change memory (PCM) as well as disks or tapes.

With continuing reference to FIG. 8, the memory hardware 920 stores instructions that when executed by the data processing 910 causes the data processing hardware 910 to perform various operations. These instructions (also known as computer programs, software, software applications or code) can be implemented in a high-level procedural and/or object-oriented programming language, and/or in assembly/machine language.

The interface 940 is used to interconnect various components within the computing system 950 as well as to interface with external components, such as the touch screen display 980 and/or the accelerometer 970. Although shown as a wired interface, the interface 940 can communication using any suitable communication medium including, but not limited to, electrical connections, wireless signaling, optical signaling, and/or other communications techniques.

The touch screen display 980 can be implemented in any suitable manner including, but not limited to, using capacitive touch technology, infrared touch technology, surface acoustic wave (SAW) touch technology, and/or resistive touch technology. Thus, the touch screen display 980 can correspond to any display device that captures input from a user by way of a tactile interface.

With continuing reference to FIG. 8, the accelerometer 970 can be implemented in a wide variety of ways, including, but not limited to, as a roll accelerometer, a pitch accelerometer, a yaw accelerometer, and/or a 3-axis accelerometer. Types of accelerometer technologies include, but are not limited to, bulk micromachined capacitive, bulk micromachined piezoelectric resistive, capacitive spring mass, microelectromechanical, magnetic induction, optical, piezoelectric, and/or surface acoustic wave (SAW).

In the illustrated embodiment, the accelerometer 970 generates accelerometer data indicating a motion of a vehicle, the touch screen display 980 generates touch location data in response to tactile input from a user, and the computing system 950 generates compensated touch location data by compensating the touch location data based on the accelerometer data.

Conclusion

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments.

What is claimed is:

1. A touch screen motion compensation system for a vehicle, the touch screen motion compensation system comprising:

an accelerometer configured to generate accelerometer data indicating a motion of the vehicle;

a touch screen display on the vehicle and that moves with the motion of the vehicle, the touch screen display configured to generate touch location data in response to tactile input from a user during a touch event, the touch screen display including a capacitive touch screen sensor configured to generate a time series of sense data indicating a relative motion between a finger of the user and the touch screen display around the touch event; and a computing system configured to generate compensated touch location data by compensating the touch location data based on the accelerometer data, the compensated touch location data based on the time series of the sense data indicating the relative motion between the finger of the user and the touch screen display around the touch event.

2. The touch screen motion compensation system of claim 1, wherein the touch location data comprises a plurality of screen coordinates, and the compensated touch location data comprise a plurality of adjusted screen coordinates.

3. The touch screen motion compensation system of claim 1, wherein the touch location data comprises a plurality of screen object interactions, and the compensated touch location data comprises a plurality of corrected screen object interactions.

4. The touch screen motion compensation system of claim 3, wherein the plurality of screen object interactions comprise a plurality of button pushes, and the plurality of corrected screen object interactions comprise a plurality of corrected button pushes.

5. The touch screen motion compensation system of claim 1, wherein the computing system is further configured to preprocess the accelerometer data using an adaptive filter.

6. The touch screen motion compensation system of claim 1, wherein the computing system is further configured to control at least one operation of the vehicle based on the compensated touch location data.

7. The touch screen motion compensation system of claim 1, wherein the computing system is further configured to receive an indication of a current user of the touch screen display from a plurality of possible users, the computing system further configured to generate the compensated touch location data based on the indication of the current user.

8. The touch screen motion compensation system of claim 1, wherein the computing system comprises a neural network.

9. The touch screen motion compensation system of claim 8, wherein the neural network is configured to be trained by a foreground training algorithm.

10. The touch screen motion compensation system of claim 8, wherein the neural network is configured to be trained by a background training algorithm running during a normal operation of the vehicle.

11. The touch screen motion compensation system of claim 8, wherein the neural network is configured to adapt to a change in a behavior of the user over time.

12. The touch screen motion compensation system of claim 1, wherein the accelerometer data is time stamped by a first plurality of time stamps, and the touch location data is time stamped by a second plurality of time stamps.

13. The touch screen motion compensation system of claim 12, wherein the computing system is configured to align the accelerometer data and the touch location data in time based on the first plurality of time stamps and the second plurality of time stamps.

14. The touch screen motion compensation system of claim 1, wherein the time series of sense data is a time series of sense current.

15. A method of touch screen motion compensation, the method comprising:

generating, by an accelerometer of a vehicle, accelerometer data indicating a motion of the vehicle;

generating, by a touch screen display on the vehicle and that moves with the motion of the vehicle, touch location data in response to tactile input from a user during a touch event, the touch screen display including a capacitive touch screen sensor generating a time series of sense data indicating a relative motion between a finger of the user and the touch screen display around the touch event; and generating, by a computing system, compensated touch location data by compensating the touch location data based on the accelerometer data, the compensated touch location data based on the time series of the sense data indicating the relative motion between the finger of the user and the touch screen display around the touch event.

16. The method of claim 15, further comprising preprocessing the accelerometer data using an adaptive filter.

17. The method of claim 15, further comprising controlling at least one operation of the vehicle based on the compensated touch location data.

18. The method of claim 15, further comprising receiving an indication of a current user of the touch screen display from a plurality of possible users and generating the compensated touch location data based on the indication of the current user.

19. The method of claim 15, wherein the time series of sense data is a time series of sense current.

20. A vehicle comprising:

a vehicle body;

an accelerometer attached to the vehicle body and configured to generate accelerometer data indicating a motion of the vehicle;

a touch screen display on the vehicle and that moves with the motion of the vehicle, the touch screen display configured to generate touch location data in response to tactile input from a user during a touch event, the touch screen display including a capacitive touch screen sensor configured to generate a time series of sense data indicating a relative motion between a finger of the user and the touch screen display around the touch event; and a computing system configured to generate compensated touch location data by compensating the touch location data based on the accelerometer data, the compensated touch location data based on the time series of the sense data indicating the relative motion between the finger of the user and the touch screen display around the touch event.

* * * * *